(12) United States Patent
Wang et al.

(10) Patent No.: US 8,483,081 B2
(45) Date of Patent: Jul. 9, 2013

(54) METHOD AND APPARATUS FOR ESTIMATING LINK QUALITY, AND LINK ADAPTION METHOD AND APPARATUS

(75) Inventors: Xiaoqin Wang, Beijing (CN); Xin Wang, Beijing (CN); Masahiro Watanabe, Kawasaki (JP); Taiji Kondo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 321 days.

(21) Appl. No.: 12/908,333

(22) Filed: Oct. 20, 2010

(65) Prior Publication Data

US 2011/0122787 A1    May 26, 2011

(30) Foreign Application Priority Data

Nov. 20, 2009  (CN) .......................... 2009 1 0226107

(51) Int. Cl.
*H04L 1/00*    (2006.01)

(52) U.S. Cl.
USPC ...................................................... 370/252

(58) Field of Classification Search
USPC .......... 370/208, 232, 252, 334, 464; 375/260, 375/242, 261, 265; 455/42, 67.11, 63.11, 455/423
See application file for complete search history.

(56) References Cited

U.S. PATENT DOCUMENTS

| | | | |
|---|---|---|---|
| 2004/0219883 A1* | 11/2004 | Pauli et al. ................. | 455/67.11 |
| 2006/0008020 A1* | 1/2006 | Blankenship et al. ........ | 375/261 |
| 2008/0273615 A1* | 11/2008 | Song et al. .................... | 375/260 |
| 2009/0092072 A1* | 4/2009 | Imamura et al. .............. | 370/315 |

FOREIGN PATENT DOCUMENTS

| | | |
|---|---|---|
| CN | 1992695 | 7/2007 |
| CN | 101282564 | 10/2008 |
| WO | 2004/098119 | 11/2004 |
| WO | 2006/046894 | 5/2006 |

OTHER PUBLICATIONS

Jaehyeong Kim, et al. "On Efficient Link Error Prediction based on Convex Metrics" Proc. IEEE VTC, pp. 4190-4194, Sep. 2004.
Chinese First Office Action dated Dec. 19, 2012, from corresponding Chinese Application No. 200910226107.7.

* cited by examiner

*Primary Examiner* — Mark Rinehart
*Assistant Examiner* — Mang Yeung
(74) *Attorney, Agent, or Firm* — Katten Muchin Rosenman LLP (57) ABSTRACT

The present invention discloses a method for estimating quality of a link in a broad-band wireless communication system. The method includes: calculating quality indicators of sub-carriers in an input signal of a receiver of the system; clipping the quality indicators of the sub-carriers; and averaging the clipped quality indicators of the sub-carriers to obtain an average value as an estimation result of an effective quality indicator of the link. The present application also discloses an apparatus for estimating quality of a link in a broad-band wireless communication system, an adaption method and apparatus for a link in a broad-band wireless communication system. The methods and apparatus of the present invention can achieve relatively low calculation complexity and high accuracy.

18 Claims, 6 Drawing Sheets

METHOD AND APPARATUS FOR ESTIMATING LINK QUALITY, AND LINK ADAPTION METHOD AND APPARATUS

FIELD OF THE INVENTION

The present invention relates to the field of wireless communication, and in particular to a method and apparatus for estimating quality of a link and an adaption method and apparatus for a link in a broad-band wireless communication system.

BACKGROUND OF THE INVENTION

Link adaption technique, or adaptive modulation and coding (AMC) technique, is widely used in wireless communication systems to increase the reliability and throughout of data transmission. In wireless communication systems, link adaption refers to automatically selecting, based on transmission channel detection, suitable transmission configuration parameters for a transmission link, such as modulation and coding scheme (MCS) and transmission power, so as to adapt to a channel varying real-time. Channel quality detection is particularly important to the link adaption technique, and its accuracy directly influences the performance of the whole system. Herein, a link refers to a wireless communication path having a certain bandwidth and consisting of a plurality of sub-carriers. In the context of the present description, the terms "channel" and "link" have the same meaning. However, in view of the expression habits of those skilled in the art, the terms "channel" and "link" may be respectively used at different scenarios.

In a narrow-band wireless communication system, average quality of a plurality of sub-carriers in a channel, i.e., average channel quality, is used as a basis for selecting transmission configuration parameters for a transmitting part. Usually, a physical signal to interference and noise ratio (PSINR) or an average signal to interference and noise ratio is used as an indicator for measuring channel quality. Such a method has an advantage of simple computation.

In an broadband wireless communication system, such as an orthogonal frequency division multiplexing (OFDM) system, an effective SINR (ESINR) or an effective signal to noise ratio (ESNR) of a channel is often used as an quality indicator of the channel (also referred to as an effective quality indicator of the channel) for overcoming influence from frequency selectivity generated due to multipath.

Figure 1:
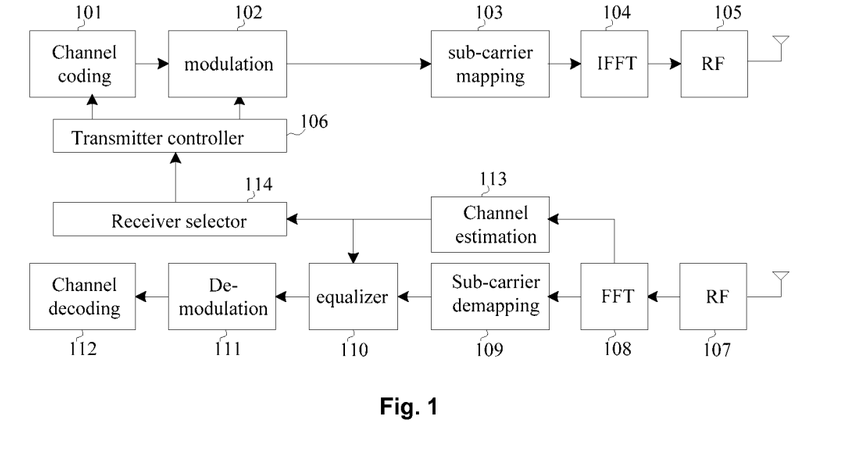
FIG. 1 is a block diagram of an example of a typical OFDM system using a link adaption technique.

FIG. 1 is a block diagram of a typical closed loop OFDM system using the link adaption technique. The OFDM system includes a transmitting part and a receiving part. The transmitting part as a transmitter includes an antenna, a radio frequency (RF) unit 105, an inverse fast Fourier transformer (IFFT) 104, a sub-carrier mapping unit 103, a modulator 102, a channel encoder 101 and a transmitter controller 106. The receiving part as a receiver includes an antenna, an RF unit 107, a fast Fourier transformer (FFT) 108, a sub-carrier demapping unit 109, a channel estimating unit 113, an equalizing unit 110, a demodulator 111, a channel decoder 112 and a receiver selector 114.

As shown in FIG. 1, at the transmitting part, the transmitter controller 106 configures transmission parameters such as a coding and modulation scheme for a link. The coding and modulation scheme is a combination of a coding scheme (CS) and a modulation mode (MD). A data stream to be transmitted, after being processed by the configured channel encoder 101 and modulator 102, the sub-carrier mapping unit 103 and the IFFT 104, is transmitted out through the antenna after being processed by the RF unit 105. At the receiving part, the RF unit 107 performs RF processing on a received signal transmitted through a radio channel, and sends the obtained baseband digital signal to the FFT 108. On one hand, the data output from the FFT 108 is transmitted to the sub-carrier demapping unit 109 for sub-carrier demapping, and, on the other hand, is also transmitted to the channel estimating unit 113 for channel estimation. After the equalizing unit 110 equalizes a signal output from the sub-carrier demapping unit 109 by using a channel estimation value output from the channel estimating unit 113, the equalized signal is demodulated and decoded by the demodulator 111 and the channel decoder 112 respectively. The channel estimation value output by the channel estimating unit 113 is also sent to the receiver selector 114 for calculating the effective quality indicator such as the ESINR or the ESNR of a channel and selecting the parameters for the next transmission. The selection result is fed back to the transmitter controller 106.

Here, the ESINR is a combination of SINRs of sub-carriers in an input signal of the receiving part. In practical computation, the SINRs of the sub-carriers refer to processed signal to interference and noise ratios of the sub-carriers (also referred to as instantaneous SINRs), which constitute an instantaneous SINR vector. If $\gamma_n$ (n=1:N) denotes an instantaneous SINR obtained based on the estimation channel value, where N is the number of effective sub-carriers used in the system, then the ESINR $\gamma_{eff}$ of the channel can be represented as:

$$\gamma_{eff} = f(\gamma_1, \gamma_2, \ldots, \gamma_N) \quad (1)$$

Usually, the mapping process of equation (1) is referred to as effective SINR mapping (ESM). Traditional ESM methods mainly include mutual information-ESM (MI-ESM), exponential ESM (EESM) and capacity ESM (CESM), etc. All of them can be represented by an equation (2) as follows:

$$\gamma_{eff} = \alpha_1 \Phi^{-1}\left[\frac{1}{N}\sum_{n=1}^{N}\Phi\left(\frac{\gamma_n}{\alpha_2}\right)\right] \quad (2)$$

wherein $\alpha_1$ and $\alpha_2$ are parameters related to the modulation and coding scheme as being used, and $\Phi(*)$ is an invertible mapping function.

Different ESM methods have different mapping functions. The following equations (3)-(5) show mapping functions $\Phi(*)$ of the above-mentioned traditional ESM methods.

I. Mapping Function of MI-ESM:

$$\Phi(\gamma_n) = \log_2(M) - \frac{1}{M}\sum_{m=1}^{M}E_U\left\{\log_2\left[1 + \sum_{k=1, k\neq m}^{M}\exp\left(-\frac{|X_k - X_m + U|^2 - |U|^2}{1/\gamma_n}\right)\right]\right\} \quad (3)$$

II. Mapping Function of EESM:

$$\Phi(\gamma_n) = \exp\left(-\frac{\gamma_n}{\beta}\right) \quad (4)$$

III. Mapping Function of CESM:

$$\Phi(\gamma_n) = \log_2\left(1 + \frac{\gamma_n}{\beta}\right) \quad (5)$$

Relevant description of the equation (3) is recorded in an International patent application WO 2006/046894, for example. Relevant description of the equation (4) is recorded in an International patent application WO 2004/098119, for example. Relevant description of the equation (5) may be referred to for in, for example, J. Kim et al., "On Efficient Link Error Prediction based on Convex Metrics", Proc. IEEE VTC, pages 4190-4194, September 2004. In the three ESM methods, the MI-ESM has a higher accuracy than those of the other two ESM methods.

It can be seen from the above that the mapping function used in traditional ESM methods is usually a nonlinear function. Moreover, in the computation process of the ESINR, SINRs $\gamma_n$ of the sub-carriers in a channel are mapped through the $\Phi(*)$ and then compressed, and then are mapped through an inverse function of the $\Phi(*)$ to become ESINR $\gamma_{eff}$ of the channel. Therefore, the real-time signal processing of the above ESM methods has a relatively high complexity. In addition, M and 13 in the above three equations are all parameters related to the currently used modulation and coding scheme, further improving the calculation complexity.

SUMMARY OF THE INVENTION

The present invention provides a link quality estimating technique and a link adaption technique with a low complexity, both of which can be applied to a broad-band wireless communication system and have characteristic of a low calculation complexity and a high accuracy.

According to an aspect of the present invention, there is provided a method for estimating quality of a link in a broadband wireless communication system. The method includes: calculating quality indicators of sub-carriers in an input signal of a receiver of the system; clipping the quality indicators of the sub-carriers; and averaging the clipped quality indicators of the sub-carriers to obtain an average value as an estimation result of an effective quality indicator of the link.

According to another aspect of the present invention, there is provided an apparatus for estimating quality of a link in a broad-band wireless communication system. The apparatus includes: a sub-carrier quality indicator calculating unit, configured to calculate quality indicators of sub-carriers in an input signal of a receiver of the system; a sub-carrier quality indicator clipping unit, configured to clip the quality indicators of the sub-carriers; and a link effective quality indicator estimating unit, configured to average the clipped quality indicators of the sub-carriers to obtain an average value as an estimation result of an effective quality indicator of the link.

According to another aspect of the present invention, there is provided an adaption method for a link in a broad-band wireless communication system. The method includes: calculating quality indicators of sub-carriers in an input signal of a receiver of the system; clipping the quality indicators of the sub-carriers; averaging the clipped quality indicators of the sub-carriers to obtain an average value; and determining an estimation result of an effective quality indicator of the link, a modulation mode and a coding rate to be sent to a transmitter of the system, based on the obtained average value.

According to another aspect of the present invention, there is provided an adaption apparatus for a link in a broad-band wireless communication system. The apparatus includes: a sub-carrier quality indicator calculating unit, configured to calculate quality indicators of sub-carriers in an input signal of a receiver of the system; a sub-carrier quality indicator clipping unit, configured to clip the quality indicators of the sub-carriers; a sub-carrier quality indicator averaging unit, configured to average the clipped quality indicators of the sub-carriers to obtain an average value; and a system parameter selecting unit, configured to determine an estimation result of an effective quality indicator of the link, a modulation mode and a coding rate to be sent to a transmitter of the system, based on the obtained average value.

The methods and apparatuses according to the present invention can achieve a relatively low calculation complexity and a relatively high accuracy, by clipping the quality indicators of the sub-carriers in an input signal and averaging the clipped quality indicators of the sub-carriers.

According to another aspect of the present invention, there is further provided a storage medium including machine-readable program codes, which, when being executed on an information processing device, enable the information processing device to execute the method for estimating quality of a link in a broad-band wireless communication system according to the present invention.

According to another aspect of the present invention, there is further provided a program product including machine-executable program instructions, which, when being executed on an information processing device, enable the information processing device to execute the method for estimating quality of a link in a broad-band wireless communication system according to the present invention.

According to another aspect of the present invention, there is further provided a storage medium including machine-readable program codes, which, when being executed on an information processing device, enable the information processing device to execute the adaption method for a link in a broad-band wireless communication system according to the present invention.

According to another aspect of the present invention, there is further provided a program product including machine-executable program instructions, which, when being executed on an information processing device, enable the information processing device to execute the adaption method for a link in a broad-band wireless communication system according to the present invention.

BRIEF DESCRIPTIONS OF THE DRAWINGS

The above and other objects, features and advantages of the present invention will be better understood from the following description, when read in conjunction with the drawings, in which identical or similar reference signs refer to identical or similar elements. In the drawings.

DETAILED DESCRIPTIONS OF THE EMBODIMENTS

The embodiments of the present invention will be described below with reference to the drawings. Elements and features described in a figure or an embodiment of the present invention may be combined with the elements and features shown in one or more other figures or embodiments. It is to be noted that, for the purpose of clarity, representations and descriptions of elements and processing which are known by those skilled in the art or are not related to the present invention, are omitted in the drawings and the description.

Figure 3:
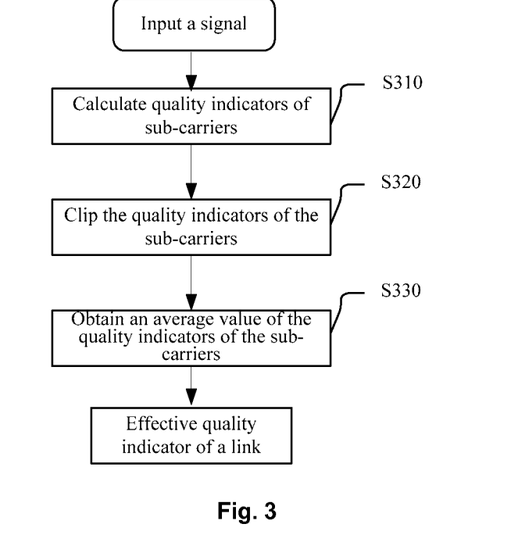
FIG. 3 is a flow chart of a method for estimating quality of a link according to an embodiment of the present invention.

FIG. 3 shows a flow chart of a method for estimating quality of a link according to an embodiment of the present invention. In the method, quality indicators of sub-carriers of a input signal are first calculated, then the quality indicators of sub-carriers obtained through the calculation are clipped, and then an average value of the quality indicators of sub-carriers is evaluated as an effective quality indicator for the link including the sub-carriers.

In the method and apparatus according to the embodiments of the present invention, various quality indicators of sub-carriers are selected according to application demands. For example, the SNRs or SINRs of the sub-carriers can be selected as quality indicators of the sub-carriers. In the following description, for the purpose of illustration, the SINR of a sub-carrier is used as an example of quality indicator of the sub-carrier. It is to be understood that other quality indicator of the sub-carrier such as the SNR thereof can also be used in other embodiments of the present invention. According to teaching of the embodiments provided in the present specification, the method and apparatus of the present invention can be implemented easily in the case of using other quality indicators of the sub-carrier such as an SNR.

As shown in FIG. 3, the method for estimating quality of a link may include the steps of S310 to S330. In step S310, quality indicators of sub-carriers in an input signal of a receiver, i.e., quality indicators of sub-carriers of a link, in a broadband wireless communication system are calculated. Various prior art methods can be used to calculate the quality indicators of the sub-carriers. For example, when an SINR of a sub-carrier is used as a quality indicator thereof, the SINR $\gamma_i$ of each sub-carrier in the input signal of the receiver may be calculated by using estimated channel values including an estimated signal power, an interference power and a noise power as provided by the broadband wireless communication system, by using an equation (6) as follows:

$$\gamma_i = \frac{P_{s,i}}{P_{I,i} + P_{N,i}} \quad (i = 1, \ldots, N) \tag{6}$$

wherein $P_{s,i}$, $P_{I,i}$ and $P_{N,i}$ indicate the estimated signal power, the interference power and the noise power on a sub-carrier i, respectively, and N is the number of the sub-carriers in the input signal. As another example, when the SNR of a sub-carrier is used as an quality indicator thereof, the SNR is a ratio of the estimated signal power to the estimated noise power on the sub-carrier, which will not be detailed here.

In order to make the amount of computation of the method for estimating quality of a link of the present invention smaller and more efficient, according to an embodiment of the present invention, only the quality indicators of the sub-carriers, which carry pilot signals, in an input signal of the receiver are calculated, without calculating quality indicators of all sub-carriers in the input signal.

Then, in step S320, quality indicators of sub-carriers obtained through the calculation are clipped such that the clipped quality indicators of the sub-carriers fall into a predetermined range.

It is to be understood that the predetermined range of the quality indicators of the sub-carriers can be set according to application demands. For example, the range of quality indicators of sub-carriers satisfying a quality demand of a broadband wireless communication system can be set in advance by an operator according to the quality demand.

In wireless communication, in order to ensure certain transmission quality, there is a demand on range for quality indicators of a channel. When the quality of the channel is better or worse than the target range, its effect on system transmission quality will no longer be prominent. Therefore, by clipping, the proportion of instantaneous quality indicators, which have relatively small effects on system performance, in the calculation of the effective quality indicator will be lowered, while the effective quality indicator obtained finally is made to reflect a practical channel quality demand to a greater extent.

In order to make higher the accuracy of the method for estimating quality of a link of the present invention, according to an embodiment of the present invention, for a given candidate modulation mode of a broadband wireless communication system, the quality indicators of the sub-carriers can be clipped based on an upper threshold and a lower threshold of a predetermined effective working area of the candidate modulation mode, so that the clipped quality indicators of the sub-carriers fall into the range of the predetermined effective working area. Specifically, the obtained quality indicators of the sub-carriers are clipped based on a predetermined effective working area of the given candidate modulation mode, such that the quality indicators of the sub-carriers between the upper threshold and the lower threshold of the predetermined effective working area of the given candidate modulation mode remain unchanged, the quality indicators of the sub-carriers above the upper threshold of the predetermined effective working area of the given candidate modulation mode are changed to the value of the upper threshold, and the quality indicators of the sub-carriers below the lower threshold of the predetermined effective working area of the given candidate modulation mode are changed to the value of the lower threshold.

The process of clipping the quality indicators of the sub-carriers based on the upper threshold and the lower threshold of the predetermined effective working area of the given candidate modulation mode of the broadband wireless communication system will be described later in conjunction with the schematic diagram of FIG. 2.

Next, in step S330, the clipped quality indicators of the sub-carriers are averaged to obtain an average value as the estimation result of the effective quality indicator of the link. For example, when using an SINR $\gamma_i$ of a sub-carrier as the quality indicator thereof, the average value of the clipped SINRs $\gamma'_i$ of sub-carriers i obtained through the calculation based on the following equation (7) can be used as the estimation result $\gamma_{eff}$ of the effective SINR of the link:

$$\gamma_{eff} = \frac{1}{N}\sum_{i=1}^{N} \gamma'_i \quad (i=1, \ldots, N) \quad (7)$$

wherein N is the number of the sub-carriers in the signal.

The process of clipping the quality indicators of the sub-carriers based on the upper threshold and the lower threshold of the predetermined effective working area of the given candidate modulation mode of the broadband wireless communication system will be described now with reference to FIG. 2. Here, the predetermined effective working area is obtained based on the performance measurement result of a candidate MCS under an AWGN channel.

Figure 2:
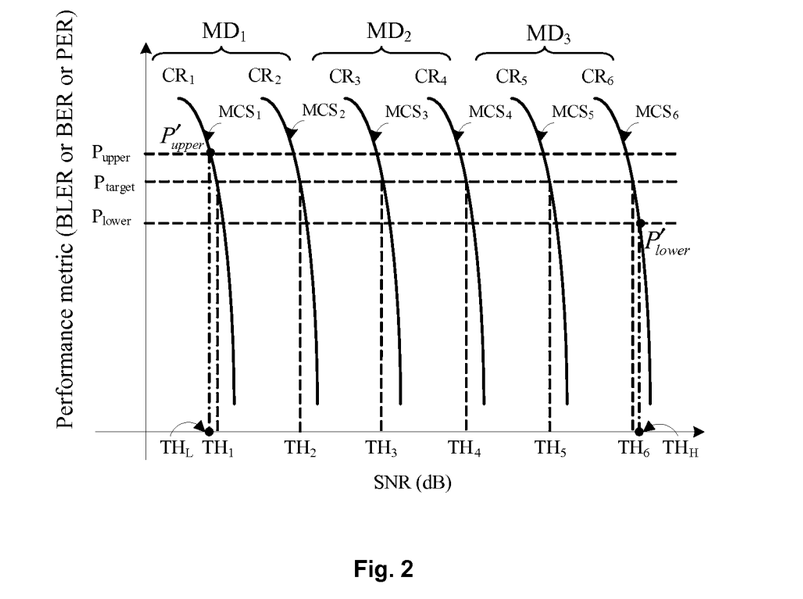
FIG. 2 is a schematic diagram of a performance measurement result of a candidate MCS under an Additive White Gaussian Noise (AWGN) channel.

FIG. 2 is an exemplary schematic diagram of a performance measurement result of a candidate MCS under an AWGN channel. The graph in FIG. 2 can be obtained by simulating the system by using a prior art method. In FIG. 2, X axis denotes a logarithmic value of the SNR under the system bandwidth. Since under the AWGN channel, there is only noise without interference, the SINR is equal to the SNR. That is, the SNR is equivalent to the SINR under the environment of AWGN channel. Y axis denotes a system performance metric, such as Bit Error Ratio (BER), Block Error Ratio (BLER) or Packet Error Ratio (PEG). $P_{target}$ indicates the target performance of the system, while the performance range acceptable for the system is from $P_{lower}$ to $P_{upper}$.

It is assumed that the number of the candidate modulation and coding schemes, the number of the candidate modulation modes and the number of the candidate coding rates of the system are $N_{MCS}$, $N_{MD}$ and $N_{CR}$, respectively. As shown in FIG. 2, for a specific candidate modulation and coding scheme $MCS_i$ (i=1, ..., $N_{MCS}$), which is a combination of a modulation mode $MD_{i'}$ (i'=1, ..., $N_{MD}$) and a coding rate $CR_{i''}$ (i''=1, ..., $N_{CR}$), only when the SNR under the candidate MCS reaches a certain threshold $TH_i$ or above, can the corresponding performance metric of the candidate MCS meet the requirement of the system target performance $P_{target}$. For example, a candidate modulation and coding scheme $MCS_1$ is a combination of a candidate modulation mode $MD_1$ and a candidate coding rate $CR_1$, and only when the SNR reaches a certain threshold $TH_1$ or above, can the performance metric reach the system target performance $P_{target}$, i.e., meet the requirement of the system target performance $P_{target}$. Meantime, for all candidate modulation and coding schemes, the general performance range acceptable for the system can be represented by $[P'_{upper}, P'_{lower}]$, which corresponds to an SNR interval $[TH_L, TH_H]$.

Here, since as an example, the performance metric of Y axis is BER, BLER or PER, etc., under the given candidate coding and modulation scheme, as the SNR increases, the BER, BLER or PER, etc. presents a descending trend. That is, along with the increase of the SNR, the performance of the system becomes better. Of course, in other embodiments of the present invention, the system performance metric of Y axis can be a throughput, etc. It can be understood that, in that case, the direction of the graph in FIG. 2 will present an opposite trend.

In FIG. 2, the number following each candidate MCS denotes the level of the candidate MCS, and likewise, the number following each candidate MD denotes the level of the candidate MD. In a wireless broadband communication system, the levels of the MCS and the MD are usually arranged in ascending order of the amount of transmission resources needed for transmitting information contents with a same size. The highest level of MD or the highest level of MCS needs the lowest amount of transmission resources, while the lowest level of MD or the lowest level of MCS needs the highest amount of transmission resources.

In the link adaption technique, the following MCS selection strategy is usually adopted: when the estimated ESINR is higher than or equal to $TH_i$ and lower than $TH_{i+1}$ meantime, the selection result of the system is $MCS_i$. In this way, not only the target performance of the system can be satisfied, but also the lowest amount of transmission resources of the system is used. That is, when the target performance of the system is not satisfied, a lower MCS level is needed to increase the performance metric. After the performance metric satisfies the target performance of the system, a MCS level as high as possible is used to reduce the use of system resources. Thereby, according to an embodiment of the present invention, the effective working areas of the candidate modulation and coding schemes $MCS_i$ can be determined based on the following equation (8):

$$\begin{cases} TH_{Li} = TH_i \\ TH_{Hi} = \begin{cases} TH_{i+1}, & (i < N_{MCS}) \\ TH_H, & (i = N_{MCS}) \end{cases} \end{cases} \quad (8)$$

wherein $TH_{Hi}$ and $TH_{Li}$ are the upper threshold and the lower threshold of the effective working area of $MCS_i$, respectively. For example, according to equation (8), in FIG. 2, the effective working area of $MCS_1$ is $[TH_1, TH_2)$, the effective working area of $MCS_2$ is $[TH_2, TH_3)$, and so on.

Based on a consideration similar to that of the MCS selection strategy, in the embodiment, the effective working area of the candidate modulation mode $MD_k$ can be determined according to the following principle: the lower thresholds of the effective working areas of all of the modulation modes are an SNR threshold $TH_L$ corresponding to the worst performance $P'_{upper}$ acceptable for the system. The upper threshold of the effective working area of each of the modulation modes is the maximum value of the upper thresholds of the predetermined effective working areas of the modulation and coding schemes corresponding to the candidate modulation mode. This can be represented by the following equation (9):

$$\begin{cases} TH_{Lk} = TH_L \\ TH_{Hk} = \max_{i \in I_k}\{TH_{Hi}\} \end{cases} \quad (k=1, \ldots, N_{MD}) \quad (9)$$

wherein $TH_{Hk}$ and $TH_{Lk}$ are the upper threshold and the lower threshold of the effective working areas of $MD_k$, respectively. $I_k$ (k=1, ..., $N_{MD}$) denotes a collection of candidate coding and modulation schemes corresponding to the candidate modulation mode $MD_k$. For example, according to the equation (9), in FIG. 2, the candidate coding and modulation schemes corresponding to $MD_1$ are $\{MCS_1, MCS_2\}$, and therefore the effective working area of $MD_1$ is $[TH_L, TH_3)$. The candidate coding and modulation schemes corresponding to $MD_2$ are $\{MCS_3, MCS_4\}$, and therefore the effective working area of $MD_2$ is $[TH_L, TH_5)$, and so on.

Then, the quality indicators of the sub-carriers can be clipped based on the previously obtained threshold information of the effective working areas of the candidate modulation modes. For example, after the SINRs $\gamma_i$ of sub-carriers in an input signal of the receiver are obtained through calculation, for a given modulation mode $MD_k$, the SINRs $\gamma_i$ of the sub-carriers can be clipped by using the upper threshold and the lower threshold of the effective working area of the modulation mode $MD_k$, and the clipping result is as shown by the following equation (10):

$$\gamma_i' = \begin{cases} \gamma_i & (TH_{Lk} < \gamma_i < TH_{Hk}) \\ TH_{Lk} & (\gamma_i \leq TH_{Lk}) \\ TH_{Hk} & (\gamma_i \geq TH_{Hk}) \end{cases} \quad (10)$$

Thus, the processing for clipping the SINRs of the sub-carriers is completed. The clipped SINRs are then averaged through the above-mentioned step S330, and the obtained average value can be used as the estimation result $\gamma_{eff}$ of the ESINR of the link.

In the above embodiments, the candidate modulation and coding schemes and the candidate modulation modes of the system refer to the modulation and coding schemes and the modulation modes that can be used by the system, respectively. The thresholds of the effective working areas of the above mentioned candidate modulation modes can be obtained in advance through a simulation experiment and are stored in the system so as to be used in the processing for estimating quality of a link and the adaption processing for a link of the present invention.

It can be seen from the above that, compared to the three prior art ESM methods, the method for estimating quality of a link in the above embodiments of the present invention can obtain an estimation value of the ESINR of a channel by merely clipping and averaging the SINR vectors of the sub-carriers in the channel with the thresholds of effective working areas of modulation modes, without a complicated invertible mapping function, thereby greatly lowering calculation complexity.

The estimation result of the effective quality indicator of a link obtained by using the method for estimating quality of the link of the present invention can be used for selecting suitable transmission configuration parameters such as a modulation and coding scheme and a transmission power, etc. for a transmission link of a transmitter, so as to adapt to real-time channel varying.

Figure 4:
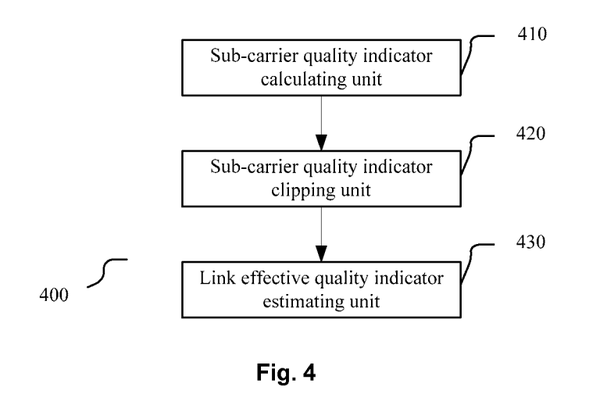
FIG. 4 is a schematic block diagram of an apparatus for estimating quality of a link according to an embodiment of the present invention.

FIG. 4 is a schematic block diagram of an apparatus for estimating quality of a link according to an embodiment of the present invention. As shown in the figure, an apparatus for estimating quality of a link 400 includes a sub-carrier quality indicator calculating unit 410, a sub-carrier quality indicator clipping unit 420 and a link effective quality indicator estimating unit 430. The apparatus for estimating quality of a link can be used for a broadband wireless communication system.

According to an embodiment of the present invention, the sub-carrier quality indicator calculating unit 410 is configured to calculate quality indicators of sub-carriers in an input signal of a receiver in the system. The sub-carrier quality indicator clipping unit 420 is configured to clip the quality indicators of the sub-carriers. The link effective quality indicator estimating unit 430 is configured to average the clipped quality indicators of the sub-carriers to obtain an average value as an estimation result of an effective quality indicator of the link.

According to another embodiment of the present invention, the sub-carrier quality indicator calculating unit 410 is further configured to calculate the quality indicators of the sub-carriers bearing pilot signals, in the input signal of the receiver in the system.

According to another embodiment of the present invention, the sub-carrier quality indicator clipping unit 420 is further configured to clip the quality indicators of the sub-carriers based on an upper threshold and a lower threshold of a predetermined effective working area of a given candidate modulation mode in the system, such that the clipped quality indicators of the sub-carriers fall into the range of the predetermined effective working area.

According to another embodiment of the present invention, a quality indicator area that is between a quality indicator required by the worst performance acceptable for the system and the maximum of the upper thresholds of predetermined effective working areas of Modulation and Coding Schemes (MCSs) corresponding to the given candidate modulation mode in an Additive White Gaussian Noise (AWGN) channel performance measurement result, is used as the predetermined effective working area of the given candidate modulation mode of the system. A quality indicator area in which the system can achieve a system target performance and save transmission resources to the most extent by using an MCS in the Additive White Gaussian Noise (AWGN) channel performance measurement result, is used as the predetermined effective working area of the given MCS of the system.

According to another embodiment of the present invention, the quality indicator is SNR or SINR.

Further details of the operations of units of the apparatus for estimating quality of a link can be found from the above embodiments of the method for estimating quality of a link, and will not be described here in detail.

Figure 5:
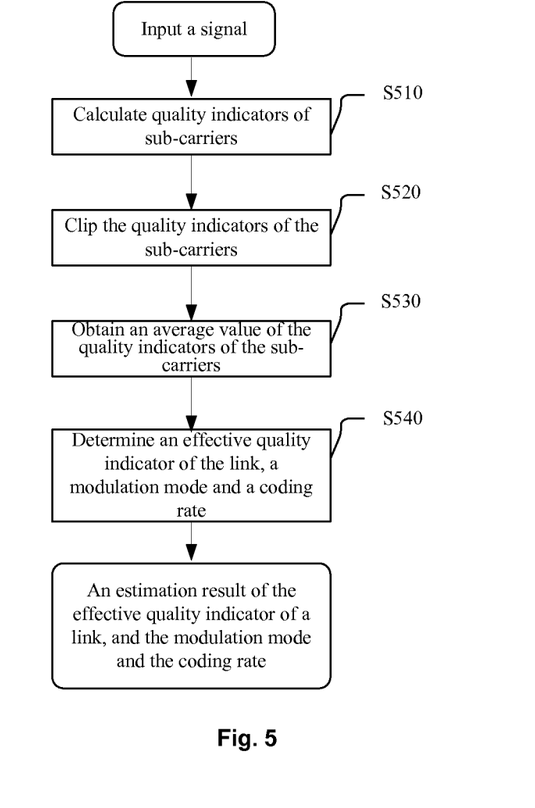
FIG. 5 is a flow chart of an adaption method for a link according to an embodiment of the present invention.

An adaption method for a link using the above mentioned technique for estimating quality of a link will be described now in conjunction with FIG. 5. FIG. 5 is a flow chart of an adaption method for a link for a broadband wireless communication system according to an embodiment of the present invention.

As shown in FIG. 5, in step S510, quality indicators of sub-carriers in an input signal of a receiver in the system are calculated. The step is identical to step S310 in FIG. 3 and will not be described here in detail.

Next, in step S520, the calculated quality indicators of the sub-carriers are clipped, such that the clipped quality indicators of the sub-carriers fall into a predetermined range. In step S530, the clipped quality indicators of the sub-carriers are averaged to obtain an average value. Then, in step S540, based on the obtained average value, a selection result of a modulation mode and a coding rate and an estimation result of an effective quality indicator of the link to be returned to the transmitter in the system are determined, so that the transmitter can use these returned parameters to perform link configuration for the next transmission.

The transmitter may configure parameters of a channel encoder and a modulator according to the obtained returned parameters, so as to adapt to a dynamic channel varying in real time, thus achieving relatively high transmission reliability and system throughput.

Figure 6:
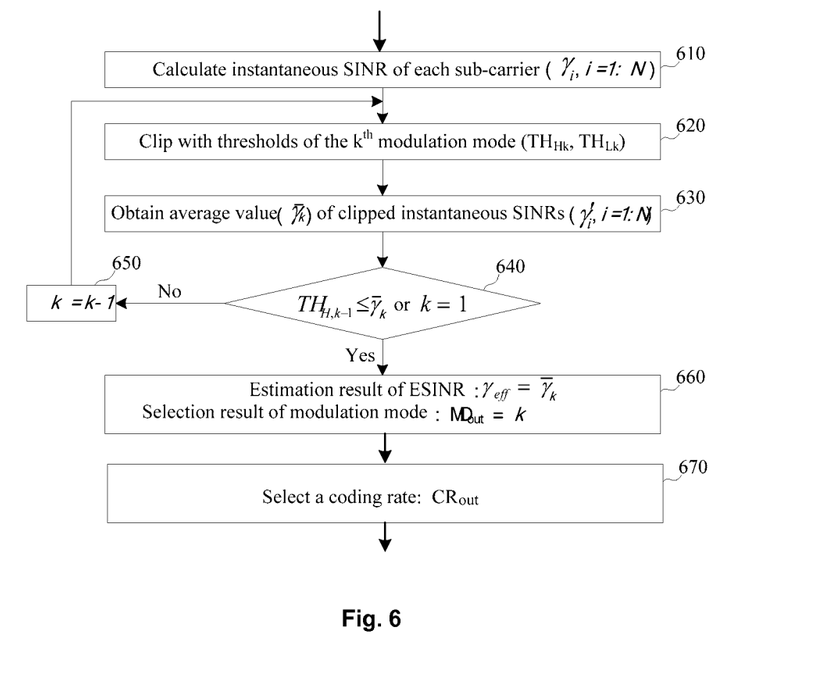
FIG. 6 is an example of an adaption method for a link according to an embodiment of the present invention.
Figure 7:
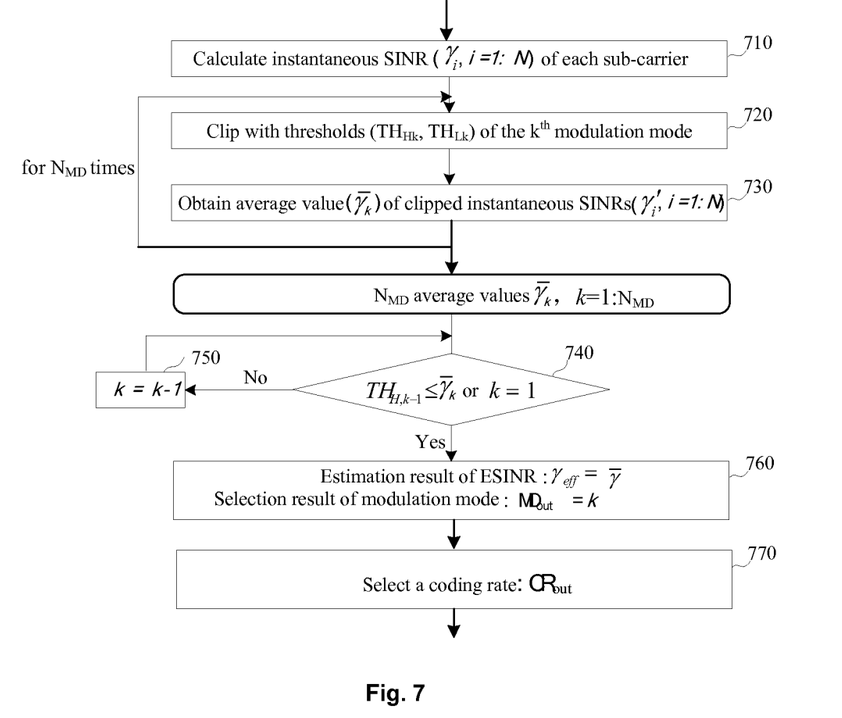
FIG. 7 is an example of an adaption method for a link according to another embodiment of the present invention.

In the adaption method for a link according to the embodiment of the present invention, in order to select a suitable modulation mode from the candidate modulation modes of the system for link adaption, quality indicators of sub-carriers are clipped based on predetermined effective working areas of the candidate modulation modes and then averaged, a suitable average value is selected as an estimation result of an effective quality indicator of a link including the sub-carriers, and the modulation mode and coding rate to be selected are determined, which will be described below in conjunction with specific examples in FIGS. 6 and 7.

FIG. 6 is an example of an adaption method for a link according to an embodiment of the present invention. In the example shown in FIG. 6, an SINR is taken as an example of quality indicators. In step 610, SINRs $\gamma_i$ (i=1, ..., N) of sub-carriers i in an input signal of a receiver in a broadband wireless communication system is calculated. This can be done by using the above equation (6).

Next, in step 620, the SINRs $\gamma_i$ of the sub-carriers are clipped based on a upper threshold and a lower threshold ($TH_{Hk}$, $TH_{Lk}$) of a predetermined effective working area of the $k^{th}$ candidate modulation mode of the system, such that the clipped SINRs $\gamma'_i$ of the sub-carriers fall into the range of the predetermined effective working area.

Then in step 630, the clipped SINRs $\gamma'_i$ (i=1, ..., N) of the sub-carriers are averaged to obtain an average value $\bar{\gamma}_k$.

Next, in step 640, it is determined whether the obtained average value $\bar{\gamma}_k$ is greater than or equal to the upper threshold of the predetermined effective working area of the $(k-1)^{th}$ candidate modulation mode of the system, or whether the $k^{th}$ candidate modulation mode is the lowest level of modulation mode (i.e., k=1) in the candidate modulation modes of the system.

If any of the above conditions is met, it can be determined in step 660 that the obtained average value $\bar{\gamma}_k$ is the estimation result $\gamma_{eff}$ of an ESINR of a link to be returned to a transmitter in the system. Meanwhile, the current $k^{th}$ candidate modulation mode $MD_k$ is the modulation mode $MD_{out}$ to be selected. Then in step 670, the estimation result $\gamma_{eff}$ of the ESINR is compared to the predetermined thresholds of several MCSs corresponding to the selected modulation mode $MD_{out}$ to determine a suitable MCS, thus determining the coding rate $CR_{out}$ to be selected. Specifically, a predetermined effective working area of an MCS where the $\gamma_{eff}$ is located can be determined, thereby determining that the coding rate corresponding to the MCS is the selection result $CR_{out}$ of a coding rate to be returned to the transmitter in the system.

If none of the above conditions are met, then in step S650, a candidate modulation mode $MD_{k-1}$ one level lower than the current candidate modulation mode $MD_k$ is selected from the candidate modulation modes of the system as a new current candidate modulation mode, and then step 620 and step 630 are repeated.

As an example, in the embodiment shown in FIG. 6, the SINRs of the sub-carriers can be clipped by using first the thresholds of the effective working area of the candidate modulation mode $MD_k$ with the highest level (k=$N_{MD}$) among the candidate modulation modes of the system.

In the embodiment shown in FIG. 6, the candidate modulation modes of the system are clipped, averaged and determined level by level. According to other embodiments of the present invention, average values of SINRs of sub-carriers with respect to all candidate modulation modes can be evaluated first, and then the average values are determined one by one. FIG. 7 shows such an example.

As shown in FIG. 7, in step 710, identical to step 610, SINRs $\gamma_i$ (i=1, ..., N) of sub-carriers i in an input signal of a receiver of the broadband wireless communication system are calculated.

Next, in step 720, the SINRs $\gamma_i$ of the sub-carriers are clipped based on an upper threshold and a lower threshold ($TH_{Hk}$, $TH_{Lk}$) of a predetermined effective working area of the $k^{th}$ candidate modulation mode of the system, such that the clipped SINRs $\gamma'_i$ of the sub-carriers fall into the range of the predetermined effective working area.

Then in step 730, the clipped SINRs $\gamma'_i$ (i=1, ..., N) of the sub-carriers are averaged to obtain an average value $\bar{\gamma}_k$.

Steps 720 and 730 are repeated for $N_{MD}$ times, to obtain $N_{MD}$ SINR average values $\bar{\gamma}_k$ (k=1, ..., $N_{MD}$) based on the predetermined effective working areas of $N_{MD}$ candidate modulation modes of the system.

Then, in step 740, it is determined one by one whether the obtained average value $\bar{\gamma}_k$ is greater than or equal to the upper threshold of the predetermined effective working area of the $(k-1)^{th}$ candidate modulation mode of the system, or whether the $k^{th}$ candidate modulation mode is the modulation mode with the lowest level (i.e., k=1) among the candidate modulation modes of the system.

If any of the above conditions is met, it can be determined in step 760 that the obtained average value $\bar{\gamma}_k$ is the estimation result $\gamma_{eff}$ of an ESINR of a link including the sub-carriers to be returned to a transmitter in the system. Meanwhile, the current $k^{th}$ candidate modulation mode $MD_k$ is determined as the modulation mode $MD_{out}$ to be selected. Then in step 770, a coding rate $CR_{out}$ to be sent to the transmitter is determined. The operations in steps 760 and 770 are identical to those in steps 660 and 670 in the embodiment shown in FIG. 6, and will not be detailed here.

If none of the above conditions are met, then in step S750, a candidate modulation mode $MD_{k-1}$ one level lower than the current candidate modulation mode $MD_k$ is selected from the candidate modulation modes of the system as a new current candidate modulation mode, and then step 740 is repeated.

Since quality indicators of sub-carriers are clipped and then averaged, the adaption method for a link of the present invention also has a low calculation complexity. In addition, since quality indicators of sub-carriers are clipped based on an upper threshold and a lower threshold of a predetermined effective working area of a candidate modulation mode of the system and then averaged, the adaption method for a link of the present invention can determine a modulation mode for the next transmission while obtaining an estimation result of an effective quality indicator of the link.

Figure 8:
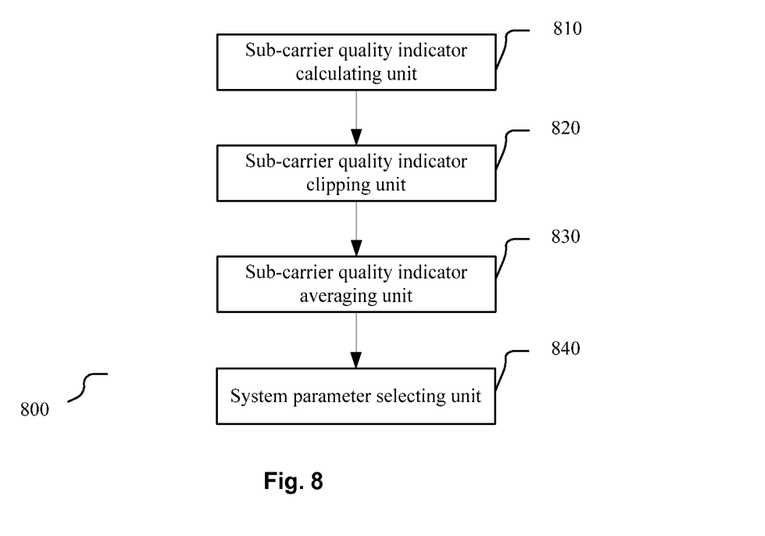
FIG. 8 is a schematic block diagram of an adaption apparatus for a link according to an embodiment of the present invention.

FIG. 8 is a schematic block diagram of an adaption apparatus for a link according to an embodiment of the present invention. As shown in FIG. 8, an adaption apparatus for a link 800 includes a sub-carrier quality indicator calculating unit 810, a sub-carrier quality indicator clipping unit 820, a sub-carrier quality indicator averaging unit 830 and a system parameter selecting unit 840.

According to an embodiment of the present invention, the sub-carrier quality indicator calculating unit 810 is configured to calculate quality indicators of sub-carriers in an input signal of a receiver of the system. The sub-carrier quality indicator clipping unit 820 is configured to clip the quality indicators of the sub-carriers. The sub-carrier quality indicator averaging unit 830 is configured to average the clipped quality indicators of the sub-carriers to obtain an average value. The system parameter selecting unit 840 is configured to determine an estimation result of an effective quality indicator of the link and a modulation mode and a coding rate to be sent to a transmitter of the system, based on the obtained average value.

According to another embodiment of the present invention, the sub-carrier quality indicator calculating unit 810 is further configured to calculate the quality indicators of the sub-carriers bearing pilot signals, in the input signal of a receiver in the system.

According to another embodiment of the present invention, the sub-carrier quality indicator clipping unit 820 is further configured to clip the quality indicators of the sub-carriers based on an upper threshold and a lower threshold of a predetermined effective working area of a current candidate modulation mode of the system such that the clipped quality indicators of the sub-carriers fall into the range of the predetermined effective working area.

According to another embodiment of the present invention, the system parameter selecting unit 840 is further configured to determine the obtained average value and the current candidate modulation mode as the estimation result of the effective quality indicator of the link and the modulation mode to be sent to the transmitter of the system respectively, if the obtained average value is greater than or equal to an upper threshold of a predetermined effective working area of a candidate modulation mode one level lower than the current candidate modulation mode or the current candidate modulation mode is the modulation mode with the lowest level among candidate modulation modes of the system; and to determine a predetermined effective working area of an MCS into which the average value falls based on predetermined effective working areas of MCSs corresponding to the determined modulation mode, so as to determine a coding rate corresponding to the MCS as the coding rate to be sent to the transmitter of the system.

According to another embodiment of the present invention, the system parameter selecting unit 840 is further configured to select the candidate modulation mode one level lower than the current candidate modulation mode from the candidate modulation modes of the system as a new current candidate modulation mode, if the average value obtained by the sub-carrier quality indicator averaging unit is less than the upper threshold of the predetermined effective working area of the candidate modulation mode one level lower than the current candidate modulation mode and the current candidate modulation mode is not the modulation mode with the lowest level among the candidate modulation modes of the system.

According to another embodiment of the present invention, the sub-carrier quality indicator clipping unit 820 is further configured to clip the quality indicators of the sub-carriers based on predetermined effective working areas of candidate modulation modes of the system respectively. The sub-carrier quality indicator averaging unit 830 is further configured to average the quality indicators of the sub-carriers clipped by the sub-carrier quality indicator clipping unit to obtain average values corresponding to the predetermined effective working areas of the candidate modulation modes of the system. The system parameter selecting unit 840 is further configured to select one of the average values and the modulation mode corresponding to the one of the average values that satisfy the following condition as the estimation result of the effective quality indicator of the link and the modulation mode to be sent to the transmitter of the system, the condition being that the one of the average values is greater than or equal to an upper threshold of a predetermined effective working area of a candidate modulation mode one level lower than the current candidate modulation mode or the current candidate modulation mode is the modulation mode with the lowest level among the candidate modulation modes of the system; and to determine a predetermined effective working area of an MCS into which the one of the average values falls based on predetermined effective working areas of MCSs corresponding to the selected modulation mode, so as to determine a coding rate corresponding to the determined MCS as the coding rate to be returned to the transmitter of the system.

According to another embodiment of the present invention, a quality indicator area that is between a quality indicator required by the worst performance acceptable for the system and the maximum of the upper thresholds of predetermined effective working areas of MCSs corresponding to the current candidate modulation mode in an AWGN channel performance measurement result, is used as the predetermined effective working area of the current candidate modulation mode of the system. A quality indicator area in which the system can achieve a system target performance and save transmission resources to the most extent by using an MCS in the AWGN channel performance measurement result, is used as the predetermined effective working area of the MCS.

Further details of the operations of the units of the adaption apparatus for a link can be found from the above embodiments of the adaption method for a link for, and will not be detailed here.

It is to be understood that, in practical applications, the apparatus for estimating quality of a link and the adaption apparatus for a link according to the embodiments of the present invention can be provided in a receiving part of a broadband wireless communication system in the form of software, hardware or firmware. As an example, the apparatus for estimating quality of a link and the adaption apparatus for a link according to the present invention can be provided in the receiver selector 114 of the OFDM system shown in FIG. 1.

Figure 9:
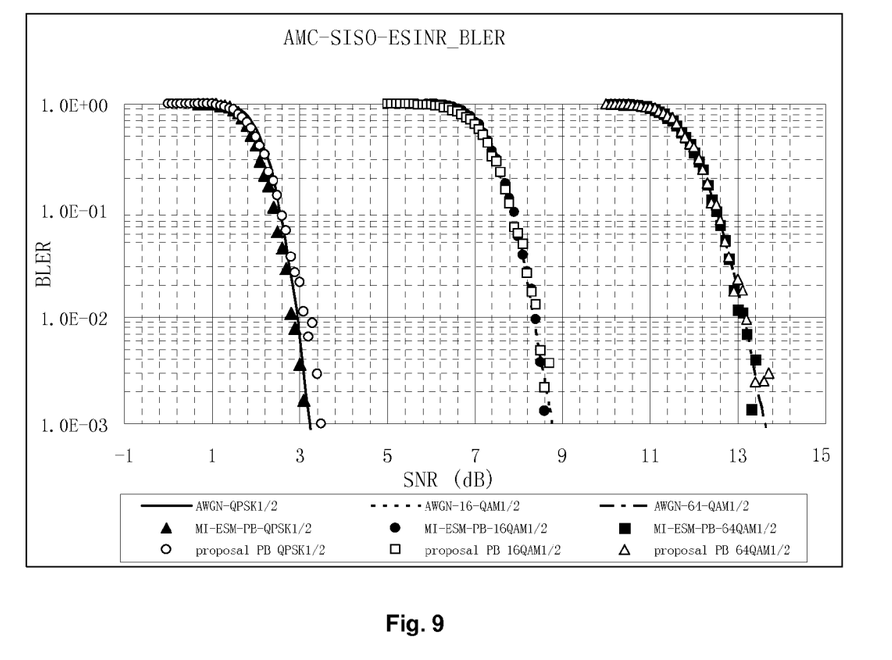
FIG. 9 is a simulation performance graph of the adaption method for a link according to the embodiment of the present invention in FIG. 6.

FIG. 9 is a simulation performance graph of the adaption method for a link of the present invention applied to a single antenna OFDM system of IEEE 802.16e. In FIG. 9, the abscissa denotes ESINR, the ordinate denotes BLER, and a PB3 channel model is adopted. The performance graphs indicated by solid lines are AWGN performance reference lines. The graphs indicated by discrete solid triangles, circles and squares are equivalent performance lines obtained by using the MI-ESM method, have relatively high accuracy and substantially coincide with the AWGN performance reference lines respectively. The graphs indicated by discrete hollow circles, squares or triangles are equivalent performance lines of ESINR estimation results obtained by using the adaption method for a link according to the present invention. As known from FIG. 9, the adaption method for a link of the present invention has accuracy similar to that of the MI-ESM method.

In addition, the constituent modules and units of the above mentioned apparatuses according to the embodiments of the present invention can be configured by way of software, hardware, firmware or the combination thereof. The specific means or manners available for the configuration are well known by those skilled in the art, and will not be described here. In the case that the constituent modules and units are implemented by way of software or firmware, a program constituting the software is loaded from a storage medium or a network to a computer having a dedicated hardware structure (such as the general purpose computer 1000 shown in FIG. 10). The computer, when loaded with various programs, can execute various functions.

Figure 10:
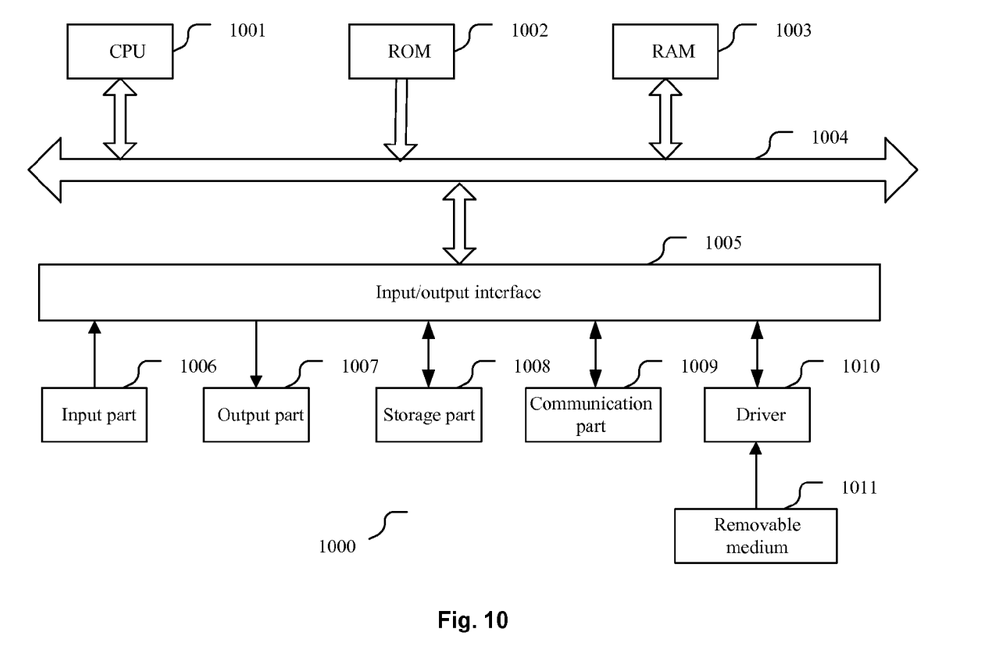
FIG. 10 is a schematic block diagram of a computer that can be used to implement a method and apparatus according to the embodiments of the present invention.

In FIG. 10, a central processing unit (CPU) 1001 executes various processes according to programs stored in a read-only memory (ROM) 1002 or programs loaded from a storage part 1008 to a random access memory (RAM) 1003. Data needed when the CPU 1001 executes various processes are stored in the RAM 1003 as required. The CPU 1001, the ROM 1002 and the RAM 1003 are connected with each other via a bus 1004. An input/output interface 1005 is also connected to the bus 1004.

The following components are connected to the input/output interface 1005: an input part 1006 (including a keyboard, a mouse and etc.), an output part 1007 (including a display such as a cathode-ray tube (CRT) and a liquid crystal display (LCD), and a speaker, etc.), the storage part 1008

(including a hard disk, etc.), and a communication part 1009 (including a network interface card such as an LAN card, a MODEM and etc.). The communication part 1009 executes communication processing via a network such as the Internet. A driver 1010 may also be connected to the input/output interface 1005 as required. A removable medium 1011 such as a magnetic disk, an optical disk, a magneto-optical disk and a semiconductor memory can be installed on the driver 1010 as required, such that the computer program read out therefrom is loaded into the storage part 1008 as required.

In the case that the above series of processes are implemented by software, a program constituting the software is loaded from a network such as the Internet or from a storage medium such as a removable medium 1011.

It is to be understood by those skilled in the art that this kind of storage medium is not limited to the removable medium 1011 storing programs therein and distributing the programs to a user(s) dependently from a device. Examples of the removable medium 1011 include a magnetic disk (including a Floppy Disk (FD) (registered trademark)), an optical disk (including a CD-ROM and a DVD), a magneto-optical disk (including Microdisk (registered trademark)) and a semiconductor memory. Alternatively, the storage medium can be the ROM 1002, a hard disk contained in the storage part 1008, etc., in which programs are stored and distributed to a user(s) along with a device containing the programs.

The present invention further provides a program product storing machine-readable instruction codes, which, when read and executed by a machine, can execute the methods according to the embodiments of the present invention.

Correspondingly, the storage medium for carrying the program product storing machine-readable instruction codes is also incorporated in the disclosure of the present invention. The storage medium includes, but is not limited to, a flexible disk, an optical disk, a magneto-optical disk, a storage card and a storage stick.

In the above description of the specific embodiments of the present invention, features described and/or illustrated with respect to one embodiment can be used in one or more other embodiments in an identical or similar manner, be combined with features in other embodiments, or replace features in other embodiments.

It is to be emphasized that, the term "comprise/include", as used in the present description, refers to the presence of features, elements, steps or components, but does not exclude the presence or addition of one or more other features, elements, steps or components.

In addition, the methods of the present invention are not limited to being executed in the chronological orders as described in the specification, but can also be executed in other chronological order, in parallel or separately. Therefore, the execution orders of the methods described in the present specification do not constitute limitations to the technical scope of the present invention.

While the present invention is disclosed with reference to descriptions for the specific embodiments of the present invention, it is understood that all of the above mentioned embodiments and examples are illustrative instead of limiting. Those skilled in the art can devise various modifications, improvements or equivalents for the present invention, within the spirit and scope of the appended claims. The modifications, improvements or equivalents should also be considered as being included in the protection scope of the present invention.

The invention claimed is:

1. A method for estimating quality of a link in a broad-band wireless communication system, comprising:
    calculating quality indicators of sub-carriers in an input signal of a receiver of the system;
    clipping the quality indicators of the sub-carriers based on thresholds of a predetermined effective working area of Modulation and Coding Schemes (MCSs) corresponding to a given candidate modulation mode of the system, wherein a quality indicator area in which the system can achieve a system target performance and save transmission resources to the most extent by using an MCS in an Additive White Gaussian Noise (AWGN) channel performance measurement result, is used as the predetermined mined effective working area of the MCS; and
    averaging the clipped quality indicators of the sub-carriers to obtain an average value as an estimation result of an effective quality indicator of the link.

2. The method of claim 1, further comprises:
    calculating the quality indicators of the sub-carriers bearing pilot signals in the input signal of the receiver of the system.

3. The method of claim 1, further comprises:
    clipping the quality indicators of the sub-carriers based on an upper threshold and a lower threshold of the predetermined effective working area such that the clipped quality indicators of the sub-carriers fall into a range of the predetermined effective working area.

4. The method of claim 1, wherein the quality indicator is Signal Noise Ratio (SNR) or Signal Interference and Noise Ratio (SINR).

5. An apparatus for estimating quality of a link in a broad-band wireless communication system, comprising:
    a sub-carrier quality indicator calculating unit, configured to calculate quality indicators of sub-carriers in an input signal of a receiver of the system;
    a sub-carrier quality indicator clipping unit, configured to clip the quality indicators of the sub-carriers based on thresholds of a predetermined effective working area of Modulation and Coding Schemes (MCSs) corresponding to a given candidate modulation mode of the system, wherein a quality indicator area in which the system can achieve a system target performance and save transmission resources to a most extent by using an MCS in an Additive White Gaussian Noise (AWGN) channel performance measurement result, is used as the predetermined effective working area of the MCS; and
    a link effective quality indicator estimating unit, configured to average the clipped quality indicators of the sub-carriers to obtain an average value as an estimation result of an effective quality indicator of the link.

6. The apparatus of claim 5, wherein the sub-carrier quality indicator calculating unit is further configured to calculate the quality indicators of the sub-carriers bearing pilot signals in the input signal of the receiver of the system.

7. The apparatus of claim 5, wherein the sub-carrier quality indicator clipping unit is further configured to clip the quality indicators of the sub-carriers based on an upper threshold and a lower threshold of the predetermined effective working area such that the clipped quality indicators of the sub-carriers fall into a range of the predetermined effective working area.

8. The apparatus of claim 5, wherein the quality indicator is Signal Noise Ratio (SNR) or Signal Interference and Noise Ratio (SINR).

9. An adaption method for a link in a broad-band wireless communication system, comprising:
    calculating quality indicators of sub-carriers in an input signal of a receiver of the system;
    clipping the quality indicators of the sub-carriers based on thresholds of a predetermined effective working area of a current candidate modulation mode of the system, wherein a quality indicator area that is between a quality indicator required by a worst performance acceptable for the system and a maximum of upper thresholds of predetermined effective working areas of Modulation and Coding Schemes (MCSs) corresponding to a current candidate modulation mode in an Additive White Gaussian Noise (AWGN) channel performance measurement result, is used as the predetermined effective working area;

averaging the clipped quality indicators of the sub-carriers to obtain an average value; and determining an estimation result of an effective quality indicator of the link, a modulation mode and a coding rate to be sent to a transmitter of the system, based on the obtained average value.

10. The method of claim 9, further comprises:

clipping the quality indicators of the sub-carriers based on an upper threshold and a lower threshold of the predetermined effective working area such that the clipped quality indicators of the sub-carriers fall into a range of the predetermined effective working area.

11. The method of claim 10, further comprises:

determining the obtained average value and the current candidate modulation mode as the estimation result of the effective quality indicator of the link and the modulation mode to be sent to the transmitter of the system respectively, if the obtained average value is greater than or equal to an upper limit of a predetermined effective working area of a candidate modulation mode one level lower than the current candidate modulation mode or the current candidate modulation mode is the modulation mode with the lowest level among candidate modulation modes of the system; and determining a predetermined effective working area of a Modulation and Coding Scheme (MCS) into which the average value falls, based on predetermined effective working areas of MCSs corresponding to the determined modulation mode, so as to determine a coding rate corresponding to the MCS as the coding rate to be sent to the transmitter of the system.

12. The method of claim 11, further comprising:

selecting the candidate modulation mode one level lower than the current candidate modulation mode from the candidate modulation modes of the system as a new current candidate modulation mode, if the obtained average value is less than the upper limit of the predetermined effective working area of the candidate modulation mode one level lower than the current candidate modulation mode and the current candidate modulation mode is not the modulation mode with the lowest level among the candidate modulation modes of the system; and repeating clipping the quality indicators of the sub-carriers, averaging the clipped quality indicators of the sub-carriers and determining an estimation result of an effective quality indicator of the link, a modulation mode and a coding rate to be sent to a transmitter of the system.

13. The method of claim 10, further comprising:

clipping and averaging the quality indicators of the sub-carriers based on predetermined effective working areas of candidate modulation modes of the system respectively to obtain average values corresponding to the predetermined effective working areas of the candidate modulation modes of the system;

selecting one of the average values and the candidate modulation mode corresponding to the one of the average values that satisfy the following condition as the estimation result of the effective quality indicator of the link and the modulation mode to be sent to the transmitter of the system, the condition being that the one of the average values is greater than or equal to an upper limit of a predetermined effective working area of a candidate modulation mode one level lower than the candidate modulation mode corresponding to the one of the average values or the candidate modulation mode corresponding to the one of the average values is the modulation mode with the lowest level among the candidate modulation modes of the system; and determining a predetermined effective working area of a Modulation and Coding Scheme (MCS) into which the one of the average values falls, based on predetermined effective working areas of MCSs corresponding to the selected modulation mode, so as to determine a coding rate corresponding to the determined MCS as the coding rate to be sent to the transmitter of the system.

14. An adaption apparatus for a link in a broad-band wireless communication system, comprising:

a sub-carrier quality indicator calculating unit, configured to calculate quality indicators of sub-carriers in an input signal of a receiver of the system;

a sub-carrier quality indicator clipping unit, configured to clip the quality indicators of the sub-carriers based on thresholds of predetermined effective working area of a current candidate modulation mode of the system, wherein a quality indicator area that is between a quality indicator required by a worst performance acceptable for the system and a maximum of upper thresholds of predetermined effective working areas of Modulation and Coding Schemes (MCSs) corresponding to a current candidate modulation mode in an Additive White Gaussian Noise (AWGN) channel performance measurement result, is used as the predetermined effective working area;

a sub-carrier quality indicator averaging unit, configured to average the clipped quality indicators of the sub-carriers to obtain an average value; and a system parameter selecting unit, configured to determine an estimation result of an effective quality indicator of the link, a modulation mode and a coding rate to be sent to a transmitter of the system, based on the obtained average value.

15. The apparatus of claim 14, wherein the sub-carrier quality indicator clipping unit is further configured to clip the quality indicators of the sub-carriers based on an upper threshold and a lower threshold of the predetermined effective working area of such that the clipped quality indicators of the sub-carriers fall into a range of the predetermined effective working area.

16. The apparatus of claim 15, wherein the system parameter selecting unit is further configured to:

determine the obtained average value and the current candidate modulation mode as the estimation result of the effective quality indicator of the link and the modulation mode to be sent to the transmitter of the system respectively, if the obtained average value is greater than or equal to an upper limit of a predetermined effective working area of a candidate modulation mode one level lower than the current candidate modulation mode or the current candidate modulation mode is the modulation mode with the lowest level among candidate modulation modes of the system; and determine a predetermined effective working area of a Modulation and Coding Scheme (MCS) into which the average value falls, based on predetermined effective working areas of MCSs corresponding to the determined modulation mode, so as to determine a coding rate corresponding to the determined MCS as the coding rate to be sent to the transmitter of the system.

17. The apparatus of claim 16, wherein the system parameter selecting unit is further configured to:
select the candidate modulation mode one level lower than the current candidate modulation mode from the candidate modulation modes of the system as a new current candidate modulation mode, if the obtained average value is less than the upper limit of the predetermined effective working area of the candidate modulation mode one level lower than the current candidate modulation mode and the current candidate modulation mode is not the modulation mode with the lowest level among the candidate modulation modes of the system.

18. The apparatus of claim 15, wherein
the sub-carrier quality indicator clipping unit is further configured to clip the quality indicators of the sub-carriers based on predetermined effective working areas of candidate modulation modes of the system respectively;
the sub-carrier quality indicator averaging unit is further configured to average the clipped quality indicators of the sub-carriers to obtain average values corresponding to the predetermined effective working areas of the candidate modulation modes of the system; and
the system parameter selecting unit is further configured to:
select one of the average values and the candidate modulation mode corresponding to the one of the average values that satisfy the following condition as the estimation result of the effective quality indicator of the link and the modulation mode to be sent to the transmitter of the system, the condition being that the one of the average values is greater than or equal to an upper limit of a predetermined effective working area of a candidate modulation mode one level lower than the candidate modulation mode corresponding to the one of the average values or the candidate modulation mode corresponding to the one of the average values is the modulation mode with the lowest level among the candidate modulation modes of the system; and
determine a predetermined effective working area of a Modulation and Coding Scheme (MCS) into which the one of the average values falls, based on predetermined effective working areas of MCSs corresponding to the selected modulation mode, so as to determine a coding rate corresponding to the determined MCS as the coding rate to be sent to the transmitter of the system.

* * * * *